US008117277B2

(12) United States Patent
Nikiel et al.

(10) Patent No.: US 8,117,277 B2
(45) Date of Patent: Feb. 14, 2012

(54) COMPONENT BASED INFRASTRUCTURE FOR SHARING FILES

(75) Inventors: Mark A. Nikiel, Redmond, WA (US);
Ignatius Setiadi, Redmond, WA (US);
Chun-Kit J. Chan, Redmond, WA (US);
Kevin N. Kim, Seattle, WA (US);
Shabbir A. Shahpurwala, Sammamish, WA (US); Wei-Chung Jones Wang, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1267 days.

(21) Appl. No.: 11/115,448

(22) Filed: Apr. 27, 2005

(65) Prior Publication Data

US 2006/0248122 A1    Nov. 2, 2006

(51) Int. Cl.
*G06F 15/16* (2006.01)
(52) U.S. Cl. .......................... 709/217; 709/204
(58) Field of Classification Search ............. 709/217, 709/201, 202, 204, 205, 212, 213, 231, 240, 709/241, 248
See application file for complete search history.

(56) References Cited

U.S. PATENT DOCUMENTS

| | | | | |
|---|---|---|---|---|
| 6,185,615 B1* | 2/2001 | Labiaga et al. | ............... | 709/224 |
| 6,343,316 B1* | 1/2002 | Sakata | ........................... | 709/213 |
| 6,367,072 B1* | 4/2002 | Justice et al. | ................ | 717/168 |
| 7,016,944 B1* | 3/2006 | Meyer et al. | .................. | 709/218 |
| 7,478,172 B1* | 1/2009 | Lee et al. | ....................... | 709/249 |
| 7,925,751 B1* | 4/2011 | Bolinger et al. | .............. | 709/225 |
| 2002/0046232 A1* | 4/2002 | Adams et al. | ................. | 709/200 |
| 2002/0156546 A1* | 10/2002 | Ramaswamy | .................. | 700/94 |
| 2003/0028554 A1* | 2/2003 | Koskimies et al. | ........... | 707/201 |
| 2003/0191827 A1* | 10/2003 | Piispanen et al. | ............. | 709/221 |
| 2004/0070678 A1* | 4/2004 | Toyama et al. | ............. | 348/231.3 |
| 2005/0256870 A1* | 11/2005 | Benco et al. | ...................... | 707/9 |
| 2006/0004600 A1* | 1/2006 | Summer et al. | .................. | 705/1 |
| 2006/0173940 A1* | 8/2006 | Guntupalli et al. | ........... | 707/206 |
| 2008/0288578 A1* | 11/2008 | Silfverberg | ................... | 709/203 |

FOREIGN PATENT DOCUMENTS

WO    WO 2005096176 A1 * 10/2005

OTHER PUBLICATIONS

Bass, Steven, "Home Office: Download Files the Easy way", Jul. 18, 2001, PCWorld [online] [retrieved on Sep. 25, 2008] Retrieved from the Internet: <http://www.pcworld.com/printable/article/id,53288/printable.hrml>.*
"SyncML Data Sync Protocol, version 1.1.2" [Online], Jun. 12, 2003 [Retrieved on: Jan. 6, 2011], Open Mobile Alliance,[Retrieved from: http://www.openmobilealliance.org/Technical/release_program/docs/DS/V1_1_2-20040721-A/OMA-SyncML-DataSyncProtocol-V1_1_2-20030612-A.pdf].*

* cited by examiner

*Primary Examiner* — Philip Chea
*Assistant Examiner* — Eric W Shepperd
(74) *Attorney, Agent, or Firm* — Shook, Hardy & Bacon L.L.P.

(57) ABSTRACT

An operating system to componentize file sharing is described, in which a file transport send object is executable on the operating system to designate a shared file for sharing, and in which a notification send object is executable on the operating system to notify of the shared file. An operating system to componentize file sharing is described, in which a file transport receive object is executable on the operating system to receive a shared file, and in which a notification receive object that is executable on the operating system to notify of the shared file.

13 Claims, 2 Drawing Sheets

COMPONENT BASED INFRASTRUCTURE FOR SHARING FILES

CROSS-REFERENCE TO RELATED APPLICATIONS

Not applicable.

STATEMENT REGARDING FEDERALLY SPONSORED RESEARCH OR DEVELOPMENT

Not applicable.

TECHNICAL FIELD

The present invention relates to operating systems. More particularly, the present invention relates to a component based infrastructure for sharing files.

BACKGROUND OF THE INVENTION

Many technologies for file sharing are well known in the art. For example, peer-to-peer (P2P) applications such as NAPSTER, KAZAA, GROKSTER, etc. rely on multiple users each downloading and installing a proprietary software application that facilitates the sharing. Each of the different platforms has a unique user interface with unique commands, protocols, etc. In order to share files on the KAZAA platform, for example, two users would both have to run the KAZAA application, and sharing may only be accomplished in real time. If a particular user of KAZAA wanted to share a file with a GROKSTER user via P2P, one or the other would have to download, install, and familiarize himself with the user interface of the new application. While some operations on the new application may be trivial to experienced P2P users, a novice user may be confused and therefore may have to spend time learning the new application before sharing.

In another example, photo sharing websites such as FOTKI, FLICKR, WEBSHOTS, etc. allow Internet users to upload photos that they would like to share with family and friends to a remote web server. Some websites require the photo owner or photo viewer (or both) to register a user account with the website before using its services. Sharing is usually accomplished out-of-phase, e.g., the photo owner uploads a group of photos to the website, the website's web server stores the photos, and other users later download the photos for viewing in their web browser. As with P2P file sharing, each website has a unique user experience. For instance, each website has different features (e.g., slide shows, randomization, etc.), a different registration process, different uploading and viewing processes, etc. Similar to P2P, a photo owner cannot upload a photo to FOTKI and expect another user to download and view the photo using FLICKR. If either the photo owner or the other users insisted on a particular website, then the other would have to become familiar with the other website, register an account, learn how to navigate the other website, etc. Again, while an experienced Web user may have little difficulty learning the features of the other website, novice Web users may find the unfamiliar website confusing. Also, many Web users are concerned about online privacy and do not like to register accounts with websites that may store personal information. This may cause a photo owner to simply not share or view photos on a particular website or may cause other users not to view shared photos on a particular website.

In yet another example, a file owner may simply create a website himself and upload the file to that website. The file owner may restrict access to the website (e.g., via password, keeping the URL confidential, etc.) or may allow anyone to access the website and download the file. In order to accomplish this, the file owner must first procure Web storage. This may be done for free, e.g., via GEOCITEES, or may require the file owner to purchase a web server, set up an account with an ISP, and act within bandwidth limitations. The disadvantages of the free web hosting options are usually advertisements, small capacity restrictions, low bandwidth restrictions, limited control over the appearance, required user account creation, etc. The disadvantages of the purchased web server option include a large capital expenditure, requisite knowledge of HTML (or other language) or ongoing programming costs to create and maintain, monthly ISP fees, etc. Neither option is ideal for everyone, as the free option would not appeal to someone who wants greater control over the appearance of the presentation and a lack of intrusive advertisements, and the costly option would not appeal to the file owner who wants to casually share a few files with family and friends.

In a further example, photo sharing applications such as PICASA may be loaded onto a file owner's computer. In addition to organizing and editing a photo owner's collection of photos, PICASA enables the photo owner to email or instant message (IM) photos to recipients and to upload photos to a weblog (blog). The disadvantages of PICASA are similar to those discussed above, namely, the photo owner must download and install new software and learn the software before using it. Also, as with P2P, a user of PICASA must perform all operations within the confines of the PICASA application. If the user does not particularly like the PICASA user interface, or if the user does not want to open another application (e.g., time or memory constraints), the sharing operation can be burdensome.

Several other relatively low-tech sharing solutions may also be used, such as attaching a file to an email or IM, transferring a file directly via wireless, Bluetooth, SCSI, bus, etc., loading the file onto a portable storage device such as a compact flash card and physically carrying the portable storage device to the destination, etc. All of these solutions have disadvantages. For example, email often separates an attachment from descriptive text, IM requires both sender and recipient to be running IM software and make the transfer in real time, direct transfer requires close proximity between sender and recipient and similar protocols, and physical transfer is slow, cumbersome, and inconvenient.

What is needed is a simple and efficient way of sharing files that does not require familiarity with different software user interfaces or hardware protocols.

SUMMARY OF THE INVENTION

The present invention overcomes the foregoing disadvantages. In the present invention, an operating system to componentize file sharing is described, in which a file transport send object is executable on the operating system to designate a shared file for sharing, and in which a notification send object is executable on the operating system to notify of the shared file. Also, an operating system to componentize file sharing is described, in which a file transport receive object is executable on the operating system to receive a shared file, and in which a notification receive object that is executable on the operating system to notify of the shared file.

BRIEF DESCRIPTION OF THE SEVERAL VIEWS OF THE DRAWINGS

The present invention is described in detail below with reference to the attached drawing figures, wherein.

DETAILED DESCRIPTION OF THE INVENTION

Figure 1:
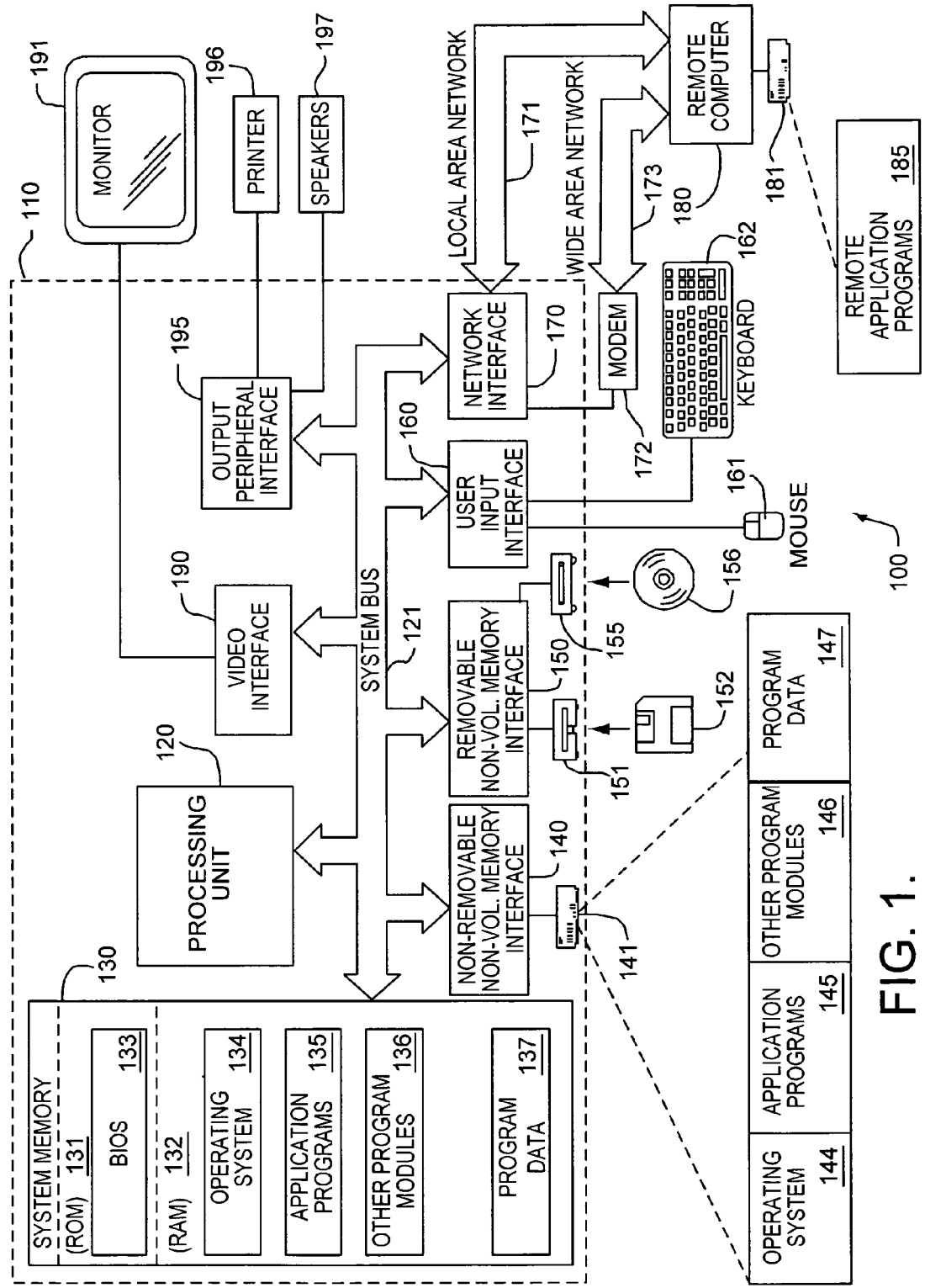
FIG. 1 is a block diagram of a computing system environment suitable for use in implementing the present invention.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Interconnect (PCI) bus also know as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable medial may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently begin operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through an non-removable memory interface such as interface 140, and magnetic disk drive 151 and optical disk drive 155 are typically connected to the system bus 121 by a removable memory interface, such as interface 150.

The drive and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different number here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through a output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user network interface 170, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Figure 2:
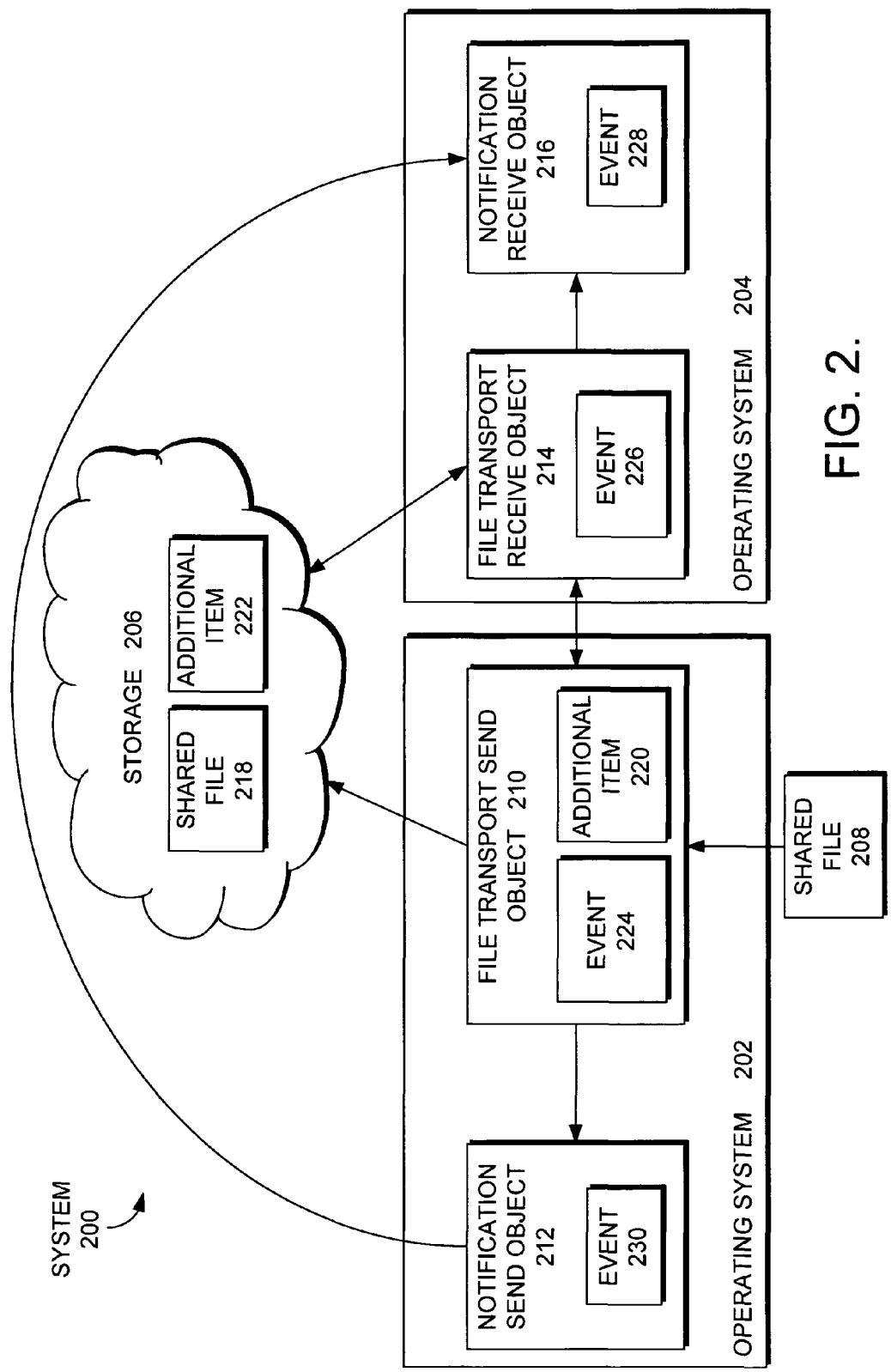
FIG. 2 is a diagram of a file sharing system, according to embodiments of the present invention.

FIG. 2 is a diagram of a file sharing system, according to embodiments of the present invention. As illustrated in FIG. 2, system 200 is a system for sharing files, including documents, images, videos, executables, components, etc. A user could operate within system 200 to share such files with other users without the difficulties and complications of the file sharing implementations discussed in the Background. For example, both the file owner and other user would be able to share the file without having to learn the same application, register a new user account with a service that will only be used to share files with each other, load unwanted software, etc. The file sharing of the present invention is componentized such that the file sharing characteristics are implemented as executable object components of operating systems 202 and 204, and are not associated with any particular software application or Web service. In fact, the operating system objects may be called by any application that is designed to work with the objects, which enables the users to utilize whatever file sharing software they want and still share files with a user utilizing different file sharing software. Also, the operating system may be designed such that no additional software is required, i.e., file sharing functionality is built in to the operating system and may be accessed directly from within the operating system by the user, e.g., by selecting a file icon. As file sharing technology further develops and in response to new capabilities, operating system developers may modify the existing objects, design new objects, or add additional objects as needed. The present invention, by design, is intended to be flexible in that regard to ensure its widespread acceptance in the industry.

As illustrated, system 200 comprises operating system 202, operating system 204, storage 206, and shared file 208. However, embodiments of the present invention are not limited to any particular number of operating systems, as just one or others may exist, some with different contents. Storage 206 is any well-known storage implementation, such as a hard drive, cache, RAM, ROM, floppy disk, zip drive, CD-RW, flash memory, compact flash card, server, etc. In an embodiment, storage 206 is closely related to operating system 202 or 204, for example, cache located on the same machine. However, embodiments of the present invention are not so limited. For example, in another embodiment, storage 206 may be remote from both operating systems, e.g., a personal web space on a remote web server. For simplicity, only one storage 206 is illustrated; however, embodiments of the present invention are not limited to a particular number of storage 206, as more or even zero storage 206 may exist depending on the particular embodiment.

Shared file 208 is any file that a user of operating system 202 designates to be shared with others. For simplicity, only one shared file 208 is illustrated; however, embodiments of the present invention are not limited to a single shared file 208, as any number may exist. In an embodiment, shared file 208 may represent a library or album of files, such that sharing the library or album inherently shares all of its contents. For example, a user may designate a single photo as shared file 208. In another example, the user may designate a music library, which consists of hundreds of audio files, as shared file 208. In a further example, the user may designate several videos as separate shared files 208. In yet another embodiment, shared file 208 represents a really simple syndication (RSS) feed. Obviously, many different permutations of shared file designation are possible with the present invention. Shared file 208 may be resident on the user's machine, e.g., hard drive, or may be accessible thereto, e.g., remote web server.

Operating system 202 is an operating system that may be run on the machine of the owner of shared file 208. Operating system 204 is an operating system that may be run on the machine of a user with whom the owner wishes to share shared file 208. In various embodiments, different numbers and associations of operating systems exist. For example, in an embodiment, the owner, on whose machine operating system 202 is running, wishes to share shared file 208 with his brother, on whose machine operating system 204 is running. However, the owner's brother may share the machine with the owner's mother, with whom the owner does not wish to share shared file 208 for whatever reason. In another embodiment, the owner, on whose machine operating system 202 is running, wishes to share shared file 208 with all seven of his cousins, each of whom have their own machine, each of which are all running separate copies operating system 204. In yet another embodiment, the owner, on whose machine operating system 202 is running, wishes to share shared file 208 with both sets of his grandparents, one set of grandparents sharing a single machine, on which operating system 204 is running, and the other set of grandparents each running two separate machines, each of which is running operating system 204. For purposes of simplicity, operating system 204 is discussed herein as the only example of the OS through which the recipients access shared file 208. However, embodiments of the present invention are not limited to a single version or brand of OS, as one recipient may be running an early version of an OS, and another recipient may be running a later version of the same or a different OS.

In an embodiment, operating system 202 comprises OS components file transport send object 210 and notification send object 212. In an embodiment, operating system 204 comprises OS components file transport receive object 214 and notification receive object 216. Embodiments of the present invention are not limited to any particular number of file transport send/receive or notification send/receive objects, as new objects may be created as needed, and existing objects may be modified or deleted over time. In an embodiment, operating system 202 may additionally comprise file transport receive object 214 and notification receive object 216, and operating system 204 may additionally comprise file transport send object 210 and notification send object 212. Thus, in an embodiment, operating system 202 may be equivalent to operating system 204. As discussed above, the operating system objects are not associated with any particular software application or Web service. Therefore, regardless of the particular software used by a user (if any at all), file sharing may be implemented by the operating systems by using the object components of operating systems 202 and 204. In an embodiment, while a particular user interface that is favored by one user may be implemented by an application, that user is still able to share files with another user who is using a different application and different user interface that is preferable to the other user.

When a user of operating system 202 designates shared file 208 to be shared, the user will have also designated the destination or person(s) with whom he would like to share, and file transport send object 210 is given that information. For example, if the user designated that shared file 208 is to be stored in a location that is accessible to others, such as storage 206 (which in this example could be a web server), then file transport send object 210 is given storage 206 as the destination. In another example, if the user designated that shared file 208 is to be shared with his relatives directly, then file transport send object 210 is given their names. For purposes of simplicity, various methods of identifying people or locations are not discussed herein, as they are well known in the art. For example, IP addresses, URLs, email addresses, usernames, account codes, etc. may all be used by file transport send object 210. If shared file 208 is to go to storage 206, file transport send object 210 transmits shared file 208 to storage 206. As illustrated in FIG. 2, shared file 218 represents shared file 208 on storage 206. In an embodiment, the shared files are identical. In another embodiment, the shared files are different. If shared file 208 is to be shared with another user, file transport send object 210 transmits shared file 208 to the other user via any common transport protocol, such as email, IM, RSS, etc. For purposes of illustration, the other user is running operating system 204 to receive shared file 208. In an embodiment, such as when the other user is running an OS that includes the technology of the present invention, file transport receive object 214 receives shared file 208. In another embodiment, such as when the other user is running an older OS or a different brand OS that does not include the technology of the present invention, there may not be a file transport receive object on the OS, and the other user simply receives shared file 208 via the transport protocol, e.g., as an email attachment. While not illustrated in FIG. 2, storage 206 may or may not be running an OS equipped with the technology of the present invention, and thus may or may not have file transport send/receive objects and notification send/receive objects. Therefore, file transport send object 210 does not require a matching file transport receive object 214 at the destination (except in some special instances, see below), and may talk down to lesser operating systems that lack the technology of the present invention. In an embodiment, if a matching file transport receive object is present on the recipient OS, then the file transport send object (in an embodiment, 210) and the file transport receive object (in an embodiment, 214) handshake with each other to establish communication.

In an embodiment, file transport send object 210 creates additional item 220 to also be shared. For example, if shared file 208 is a large, high-resolution photo, additional item 220 may be a smaller, lower-resolution thumbnail version of the photo. In another example, if shared file 208 is an audio file, additional item 220 may be the user's commentary to the people with whom he is sharing, e.g., "you'll really like the chorus on this song." However, embodiments of the present invention are not limited to any particular additional item 220, as anything that supplements shared file 208 may be used. If additional item 220 is created, it is transmitted along with shared file 208 and addressed accordingly upon receipt. For example, if additional item 220 is a thumbnail and shared file 208 was transmitted to a web server, the thumbnail may be displayed in place of the full resolution version of shared file 208 to users with whom shared file 208 is being shared. In another example, if additional item 220 is the user's commentary and shared file 208 was transmitted via email, the commentary may be contained in the body of the message, followed by an icon to play the audio file. As illustrated in FIG. 2, additional item 222 represents additional item 220 on storage 206. In an embodiment, the additional items are identical. In another embodiment, the additional items are different.

As discussed above, shared file 208 and additional item 220 may be transmitted directly to operating system 204 or may be transmitted to storage 206. If transmitted directly, file transport receive object 214 is not always required. For example, even without a corresponding file transport receive object, file transport send object 210 may dump the file(s) into dumb storage using a protocol that the recipient OS is already using, e.g., FTP, HTTP POST, WebDAV, etc. However, if operating system 204 is equipped with file transport receive object 214, increased functionality, e.g., event notification as described in greater detail below, becomes possible. If shared file 208 and additional item 220 are transmitted to storage 206, a user with whom they are intended to be shared may eventually want to download them. In such an embodiment, if the user is using an OS without the technology of the present invention, the user must access storage 206 in a conventional method, e.g., via the Internet if storage 206 is a web server. However, if the user is using operating system 204, which is equipped with file transport receive object 214, then the user may set up operating system 204 to poll storage 206. The polling may be for shared file 208/218 or additional item 220/222 in particular, for updates/additions to any shared files or additional items already stored on storage 206, etc. Upon discovering that desirable files exist on storage 206, the user may download them.

When viewing shared file 208/218 or additional item 220/222, the user experience depends on whether file transport receive object 214 exists on the user's OS. In an embodiment, file transport send object 210 requires the presence of file transport receive object 214 on the recipient system, e.g., in a P2P scenario. Without file transport receive object 214, the user experience would be similar to that which is available currently, i.e., retrieving files from storage 206, local dumb storage, an email message, etc., and opening them individually and manually. If file transport receive object 214 is on the user's OS, then the user experience may be dramatically improved. For example, applications such as organizers or photo libraries can take advantage of file transport receive object 214 by automatically downloading files/photos and adding the photos into a library. Other applications such as picture frame displays can take advantage of file transport receive object 214 by displaying the downloaded photos in the frame. In addition, one advantage of the present invention is resource savings. For example, when transmitting files via traditional email, attachments are usually stored on the recipients email server until downloaded. If the attachment is a high resolution image, the space occupied by the attachment alone may be several megabytes. In contrast, with the present invention, that same email may only contain a thumbnail attachment of the original image, which occupies much less space on the recipient's email server. The full-sized images can be stored, for example, on an FTP server, a third party server, or the sender's own machine. The email that the recipient receives may contain, for example, links to the full-sized images on a server, file transport receive object 214 may process the email and some additional information in the email to contact the sender's file transport send object 210 for downloading the full-sized images, etc.

Notification may be implemented separately or in conjunction with file transfer. As discussed above, operating system 202 may comprise notification send object 212, and operating system 204 may comprise notification receive object 216. The notification objects operate to notify other objects or users of shared files. For example, notification send object 212 may notify a user of operating system 204, e.g., by email or IM, that a sharing relationship between operating system 202 and operating system 204 has been established and that shared file 208 is available. In another example, notification receive object 216 may notify a user of operating system 204, e.g., by pop-up window, that polling has resulted in the discovery of shared file 218 and additional item 222 on storage 206. In yet another example, notification receive object 216 receives a notification and redirects the message to a user's mobile communications device if the user chooses to be notified in that manner. In a further example, notification receive object 216 is called by a photo organization application and sends the event to the application instead, and the application can then act on the received photos automatically without user intervention. Embodiments of the present invention are not limited to polling, as notification may be event-driven. As with the file transport objects, notification send object 212 may talk down to lesser technology, i.e., an OS without a notification receive object. For example, notification send object 212 does not require a corresponding notification receive object to notify a user of operating system 204 of shared file 208 via email; however, in that case, the user experience on the recipient side is not as rich.

In an embodiment, if transmission of shared file 208/218 or additional item 220/222 is ever interrupted, the transmission may be resumed from the point at which transmission ended, or may be begun anew. Therefore, transmission of the interrupted file and any remaining untransmitted files may begin anew, transmission of all files may begin anew, or transmission of a particular interrupted file may resume after the last confirmed group of bits/bytes/kilobytes/megabytes, etc., depending on the particular transmission protocol and error correction, if any.

Each object may send and read events as needed. For example, if file transport receive object 214 is polling storage 206 for shared file 218, whenever shared file 218 becomes available, file transport receive object 214 may fire event 226 accordingly. In that example, notification receive object 216 would note the existence of event 226 and notify a user of the event. In another example, if shared file 208 is directly transmitted to file transport receive object 214 and notification receive object 216 is notified via IM, notification receive object 216 fires event 228. In an embodiment, file transport send object 210 and notification send object 212 may fire events 224 and 230, respectively, regarding their status of sending files/photos to the recipient. This will give the sender status on what files are being transferred to the recipient. In addition, events may be filtered such that a user may specify particular events or thresholds for which he desires notification.

Although the present invention has been described with reference to specific exemplary embodiments, it will be evident that various modifications and changes may be made to these embodiments without departing from the broader spirit and scope of the invention. Accordingly, the specification and drawings are to be regarded in an illustrative rather than a restrictive sense.

The invention claimed is:

1. A system to componentize file sharing by an operating system, the system comprising:
   a first computing device having a processor that executes a first operating system, the first operating system configured to receive a designation of a file for sharing from a user without the execution of any other application, and to transmit the file by executing a file transport send object that is a component of the first operating system, and to provide a notification, to a second operating system executing on a second computing device, that the file is available for sharing by executing a notification send object that is a component of the first operating system;
   a data storage device that is configured to receive the file from the first computing device and to store the file in a computer memory; and
   the second computing device having a processor that executes the second operating system, the second operating system executing a notification receive object that is a component of the second operating system, and receiving the notification from the notification send object of the first operating system, and receiving the file for sharing from the data storage device by executing a file transport receive object that is a component of the second operating system,
   wherein the file transport send object, the notification send object, the notification receive object, and the file transport receive object are executable by the first and second operating systems without the execution of any other applications.

2. The system of claim 1, wherein the file transport send object is executed by the first operating system to send an event.

3. The system of claim 1, wherein the notification send object is executed by the first operating system to send an event.

4. The system of claim 1, wherein the file transport send object transmits the file to the data storage device via a network connection.

5. The system claim 4, wherein the file transport send object transmits an additional item to the data storage device.

6. A computer-implemented method for an operating system to componentize file sharing, the method comprising:
   receiving, by a notification receive object that is a component of a first operating system executing on a first computing device having a processor, a notification from a notification send object of a second operating system, the notification indicating that a file is designated for sharing by a user of the second computing device and that the file is available for sharing, the file being designated for sharing without the execution of any other application, and the notification send object being a component of the second operating system; and executing a file transport receive object that is a component of the first operating system to receive the file from a file transport send object that is a component of the second operating system, wherein the notification receive object, the notification send object, the file transport receive object, and the file transport send object are executable by the first and second operating systems without the execution of any other applications.

7. The method of claim 6, wherein the notification receive object is executed by the first operating system to poll for the shared file.

8. The method of claim 6, wherein the file transport receive object is executed by the first operating system to retrieve the shared file from storage.

9. The method of claim 8, wherein the file transport receive object is executed by the first operating system to retrieve an additional item from the storage.

10. The method of claim 6, wherein the file transport receive object handshakes with file transport send object executed by the second operating system to send the shared file to the first operating system.

11. The method of claim 6, wherein, after being interrupted, the receiving may resume or may begin anew.

12. A method of file sharing, the method comprising:

initiating by a computing device having a processor and a memory, an operating system having a file transport send object that is a component of the operating system;

receiving a request at a first software application executed by the computing device to designate at least one file to be shared;

receiving a request at the first software application to designate at least one recipient computing device with which to share the at least one file to be shared;

receiving, by the operating system, a call request from the first software application calling the file transport send object of the operating system;

transmitting by the computing device, the at least one shared file to the at least one recipient computing device, wherein the file transport send object of the operating system transmits the at least one shared file to the at least one recipient computing device receiving by a file transport receive object executing as a component of a second operating system on the recipient computing device, the at least one shared file, using the at least one shared file at the recipient computing device by a second application comprised of different code than the first application, the second application being compatible with the file transport receive object of the second operating system, and wherein the file transport send object and the file transport receive object are object program modules programmed in object-oriented programming code, are components of operating systems, and are each called by any software application compatible with object program modules programmed in object-oriented programming code.

13. The method of claim 12, wherein the first application and the second application are provided by different vendors.

* * * * *